Patented May 15, 1951

2,552,575

UNITED STATES PATENT OFFICE 2,552,575

O,O-DI(2-ALLYLPHENYL) N-ALKYLAMIDO-THIOPHOSPHATES

Clarence L. Moyle, Clare, Mich., assignor to The Dow Chemical Company, Midland, Mich., a corporation of Delaware No Drawing. Application August 30, 1948,
Serial No. 46,932

4 Claims. (Cl. 260—461)

1

This invention is directed to O,O-di-(2-allylphenyl) N-alkylamidothiophosphates having the following formula

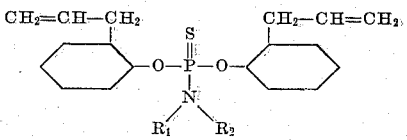

wherein $R_1$ represents an alkyl radical and $R_2$ represents hydrogen or an alkyl radical.

The new amidothiophosphates are oils or low-melting solids, somewhat soluble in many organic solvents, substantially insoluble in water, stable to light and air, not appreciably affected by carbon dioxide and non-corrosive to the skin of man and higher animals. These products are particularly valuable as constituents of insecticide compositions. They may also be employed as modifiers in plastic compositions and as intermediates in the preparation of more complex organic derivatives.

The new products may be prepared by reacting an alkali metal 2-allylphenolate with an N-substituted dichlorothiophosphoramide having the formula

wherein $R_1$ represents an alkyl radical and $R_2$ represents hydrogen or an alkyl radical. Good yields are obtained by employing 2 molecular proportions of phenolate and 1 molecular proportion of the N-substituted dichlorothiophosphoramide. The reaction may be carried out in the presence of an inert organic solvent such as methyl alcohol, ethyl alcohol, carbon tetrachloride and benzene. The 2-allylphenolate and N-substituted dichlorothiophosphoramide are reacted together at a temperature of from 30° to 100° C. The reaction is exothermic and temperature control is maintained by the rate of addition of one reactant to the other, as well as by the addition and subtraction of heat, if required. Following the reaction, the O,O-di-(2-allylphenyl) N-alkylamidothiophosphate product is separated by conventional means.

In a representative preparation, 2 mols of 2-allylphenol and 2 mols of sodium or potassium hydroxide are reacted together in methyl alcohol. 1 mol of an N-substituted dichlorothiophosphoramide is then added portionwise to the above product and the resulting mixture warmed for a short time at a temperature of 45° to 70° C. to complete the reaction. The vessel and contents are then cooled to room temperature and the reaction product dispersed in methylene dichloride. This solvent solution is successively washed with dilute aqueous ammonium or sodium hydroxide and water, and dried with anhydrous sodium sulphate. The desired product is then separated by evaporation of the solvent. In an alternative procedure, the N-substituted dichlorothiophosphoramide is added portionwise to the 2-allylphenolate. The conditions of reaction and methods of separation are essentially as set forth above.

The N-substituted dichlorothiophosphoramides employed as starting materials may be prepared by reacting a hydrochloride of a mono- or dialkyl amine with a molecular excess of thiophosphoryl chloride ($PSCl_3$). Good yields are obtained in preparations employing from 2 to 4 molecular proportions of thiophosphoryl chloride per molecular proportion of the amine salt. The reaction is carried out at the boiling temperature of the reaction mixture and is accompanied by the evolution of hydrogen chloride. Following the reaction, the mixture is fractionally distilled under reduced pressure to obtain the N-substituted dichlorothiophosphoramide.

The following examples illustrate the invention but are not to be construed as limiting.

*Example 1.—O,O-di-(2-allylphenyl) N-methylamidothiophosphate*

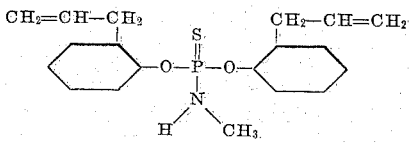

8.05 grams (0.06 mol) of 2-allylphenol and 3.35 grams (0.06 mol) of potassium hydroxide were reacted together in 20 grams of methyl alcohol. 4.9 grams (0.03 mol) of N-methyl dichlorothiophosphoramide was added portionwise to the above mixture with stirring over a period of 2 minutes. The temperature rose to 50° C. during the addition and stirring was continued at this temperature for 10 minutes. The reaction mixture was then dispersed in methylene dichloride and the resultant solution washed with dilute aqueous ammonium hydroxide. An emulsion which formed during the washing of the crude reaction product with water was broken by acidifying the mixture. The aqueous and solvent layers were separated and the latter dried with anhydrous sodium sulphate. The methylene dichloride was then removed by evaporation to obtain and O,O-di-(2-allylphenyl) N-methylamidothiophosphate product as a brown oil having a density of 1.09 at 26° C. and a refractive index $n/D$ of 1.5302 at 35° C.

*Example 2.—O,O-di-(2-allylphenyl) N-isopropylamidothiophosphate*

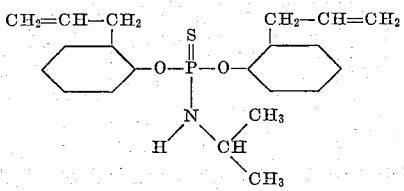

16.5 grams (0.123 mol) of 2-allylphenyl and 6.9 grams (0.123 mol) of potassium hydroxide were reacted together in 48 grams of methyl alcohol. 11.8 grams (0.0615 mol) of N-isopropyl dichlorothiophosphoramide was added portionwise to the above product over a period of 5 minutes with stirring and cooling to 30° to 40° C. The reaction mixture was then diluted with water and the organic products of reaction extracted with methylene dichloride. The solvent extract was successively washed with dilute aqueous ammonium hydroxide and water, and dried with anhydrous sodium sulphate. The methylene dichloride was then removed by evaporation to obtain an O,O-di-(2-allylphenyl) N - isopropylamidothiophosphate product as a pale orange oil having a density of 0.97 at 19° C. and a refractive index $n/D$ of 1.5170 at 35° C.

*Example 3.—O,O-di-(2-allylphenyl) N,N-dimethylamidothiophosphate*

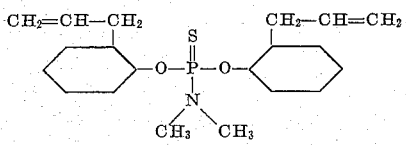

22.5 grams (0.168 mol) of 2-allylphenol and 9.4 grams (0.168 mol) of potassium hydroxide were reacted together in 59 grams of ethyl alcohol. 15 grams (0.084 mol) of N,N-dimethyl dichlorothiophosphoramide was added to the above mixture with stirring. The temperature following the addition rose to 68° C. and the mixture was subsequently warmed for 15 minutes at 70° to 75° C. to complete the reaction. The reactor and contents were then cooled to room temperature, the crude product diluted with water, and the organic products of reaction extracted with methylene dichloride. This solvent extract was successively washed with dilute aqueous ammonium hydroxide and water, and dried with anhydrous sodium sulphate. The methylene dichloride was then removed by evaporation to obtain an O,O-di-(2-allylphenyl) N,N-dimethylamidothiophosphate product as a dark brown oil having a density of 1.06 at 25° C. and a refractive index $n/D$ of 1.5428 at 25° C.

*Example 4.—O,O-di-(2-allylphenyl) N,N-diethylamidothiophosphate*

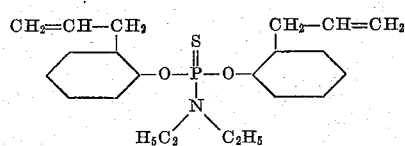

22.8 grams (0.17 mol) of 2-allylphenol and 9.5 grams (0.17 mol) of potassium hydroxide were reacted together in 60 grams of methyl alcohol and the resulting product added with stirring to 17.5 grams (0.085 mol) of N,N-diethyl dichlorothiophosphoramide. The mixture was then warmed for 15 minutes at a temperature of 50° to 55° C. to complete the reaction and thereafter cooled to room temperature. The reaction product was dispersed in methylene dichloride and the resultant solution successively washed with dilute aqueous ammonium hydroxide and water, and dried with anhydrous sodium sulphate. The methylene dichloride was removed by evaporation to obtain an O,O-di-(2-allylphenyl) N,N-diethylamidothiophosphate product as an orange oil having a density of 1.04 at 25° C. and a refractive index $n/D$ of 1.5233 at 35° C.

In a similar manner other O,O-di-(2-allylphenyl) N-alkylamidothiophosphate products may be prepared of which the following are representative.

O,O-di-(2-allylphenyl) N, N-disecondarybutyl-amidothiophosphate by reacting together sodium 2-allylphenolate and N,N-disecondarybutyl dichlorothiophosphoramide.

O,O-di-(2-allylphenyl) N-normaloctylamidothiophosphate by reacting together potassium 2-allylphenolate and N-normaloctyl dichlorothiophosphoramide.

O,O-di-(2-allylphenyl) N-ethylamidothiophosphate by reacting together sodium 2-allylphenolate and N-ethyl dichlorothiophosphoramide.

O,O - di - (2 - allylphenyl) N-normaldodecyl-amidothiophosphate by reacting together sodium 2-allylphenolate and N-normaldodecyl dichlorothiophosphoramide.

The new amidothiophosphates have been found valuable as agricultural insecticides. In representative operations, aqueous spray compositions containing the products of the preceding examples have been found effective against two-spotted spider mite, bean aphid and Mexican bean beetle. In such spray compositions, the new toxicants have been incorporated with representative wetting, emulsifying and dispersing agents and extenders. When employed for the control of American roach nymphs, 100 per cent kills have been obtained in 48 hours by allowing the insects to feed upon white flour containing 1 per cent by weight of the toxicants.

I claim:

1. An O,O-di-(2-allylphenyl) N-alkylamidothiophosphate having the formula

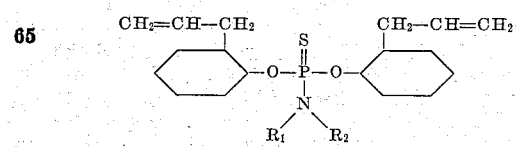

wherein $R_1$ represents an alkyl radical and $R_2$ represents a member of the group consisting of hydrogen and alkyl radicals.

2. O,O-di-(2-allylphenyl) N-methylamidothiophosphate.

3. O,O-di-(2-allylphenyl) N,N-dimethylamidothiophosphate.

4. O,O-di-(2-allylphenyl) N,N-diethylamidothiophosphate.

CLARENCE L. MOYLE.

REFERENCES CITED

The following references are of record in the file of this patent:

UNITED STATES PATENTS

| Number | Name | Date |
|---|---|---|
| 2,146,584 | Lipkin | Feb. 7, 1939 |
| 2,172,241 | Dickey et al. | Sept. 5, 1939 |
| 2,275,041 | Britton et al. | Mar. 3, 1942 |

FOREIGN PATENTS

| Number | Country | Date |
|---|---|---|
| 500,386 | Great Britain | Feb. 8, 1939 |

OTHER REFERENCES

Autenrieth et al.: "Ber. deutsch. chem. Ges.," vol. 31 (1898), pp. 1094–1100.